United States Patent [19]

Hansen

[11] 3,997,192
[45] Dec. 14, 1976

[54] UNIVERSAL COUPLING FOR MOVABLE IRRIGATION PIPES

[75] Inventor: James E. Hansen, Lubbock, Tex.

[73] Assignee: Gifford-Hill & Company, Inc., Dallas, Tex.

[22] Filed: Feb. 27, 1975

[21] Appl. No.: 553,801

[52] U.S. Cl. .................................. 285/5; 285/226
[51] Int. Cl.$^2$ .................................... B05B 15/00
[58] Field of Search ............... 285/5, 6, 45, 226; 137/344

[56] References Cited

UNITED STATES PATENTS

| | | | |
|---|---|---|---|
| 2,270,089 | 1/1942 | Stout | 285/5 |
| 2,442,034 | 5/1948 | Busch | 285/5 |
| 2,573,366 | 10/1951 | Scholl | 285/45 |
| 2,591,531 | 4/1952 | Fishback | 285/5 |
| 3,162,469 | 12/1964 | Shohan | 285/5 |
| 3,331,620 | 7/1967 | Bickard | 285/5 |
| 3,851,659 | 12/1974 | Zimmerer et al. | 137/344 |

FOREIGN PATENTS OR APPLICATIONS

| | | | |
|---|---|---|---|
| 1,394,154 | 2/1965 | France | 285/6 |
| 604,378 | 5/1960 | Italy | 285/5 |

*Primary Examiner*—Reinaldo P. Machado
*Attorney, Agent, or Firm*—Bard, Springs & Jackson

[57] ABSTRACT

A universal coupling for irrigation pipes that are incorporated into continuously movable land surface irrigation systems may incorporate pipe sections having extremities that are adapted to be positioned one within the other. A connector projection extends from one of the pipe sections and is adapted to be received within a connection aperture defined in the opposite one of the pipe sections upon assembly of the pipe sections. The coupling has a load bearing capability which is promoted by one of the extremities of each one of the pipe sections being supported directly by a mobile tower which the opposite extremity thereof bears upon the supported extremity of the adjacent pipe section, thereby causing both of the pipe sections to be supported one relative to the other. At least one of the extremities of one of the pipe sections is formed to allow substantially vertical movement of the opposite pipe section during assembly and disassembly thereof. A bearing and positioning element is adapted to be interposed between the pipe sections to establish proper positioning of the pipe sections in the assembled condition thereof and to prevent wear during relative movement of the pipe sections. Sealing of the pipe sections may be established by means of a flexible fluid impervious boot positioned about the joint between the pipe sections and secured in sealed relation to each of the pipe sections.

18 Claims, 6 Drawing Figures

UNIVERSAL COUPLING FOR MOVABLE IRRIGATION PIPES

FIELD OF THE INVENTION

This invention relates generally to continuously movable irrigation systems for irrigating large land areas such as fields of crops that may be irrigated by wheel supported movable irrigation systems which are moved over the land surface while spraying water therefrom. More specifically, the present invention is directed to a universally movable coupling for irrigation pipe sections that are supported by movable irrigation systems, which irrigation pipes are connected in universally movable assembly to allow for articulation of pipe sections to compensate for horizontal misalignment of the pipe sections and to accommodate vertical movement during changes in grade of the surface being irrigated. The present invention also relates to couplings for irrigation pipe systems that may be simply and efficiently disassembled and assembled during initial assembly, repair or servicing of the irrigation systems.

BACKGROUND OF THE INVENTION

Automatically movable irrigation systems have been employed for a considerable period of time for the purpose of irrigating land areas under conditions where rainfall is insufficient for optimum growing of crops. One example of a tower suppoted movable irrigation system which, in this case, is movable in circular manner about a central water supply pivot is depicted in U.S. Pat. No. 3,808,823 to Reinke. Where movable wheel tower supported irrigation systems are employed, in some cases the speed of rotation or speed of movement of each of the sections of irrigation pipe is controlled by a single speed electric motor that is intermittently energized and deenergized responsive to the angular relationship between the particular pipe sections that are involved. The electric drive motor, together with its reduction gear mechanism, will remain deenergized until a particular horizontal angular relationship is reached responsive to movement of adjacent towers of the irrigation system at which time the electric drive motor will become energized thus moving its associated tower sufficiently to develop another predetermined horizontal angular relationship between the pipe sections involved, at which time the motor will be deenergized. This feature eliminates the need for expensive motor drive systems of varying speed for each of the pipe sections that revolve about the central pivot point and enhances the competitive nature of such irrigation systems.

As tower supported irrigation systems move during irrigation of land areas, changes in grade occur due to unevenness of the land surface. It is necessary that the various pipe sections that interfit to transport water from the water supply to the irrigation system be capable of vertical movement to accomodate changes in grade as well as accommodating horizontal angular misalignment responsive to tower movement. It is therefore desirable to provide coupled irrigation pipes with a pipe coupling that efficiently allows universal movement of the connected pipe sections so as to prevent the development of any strains that might otherwise cause deterioration of the connections between the pipe sections.

Where irrigation pipes are supported by mobile towers, it is typical for each extremity of each of the various spans of irrigation pipe to be physically supported by the mobile tower devices or by load supporting devices that are in turn supported by the mobile towers. The irrigation pipe sections defined by the various spans of the irrigation system must be supported in such manner that the extremities of adjacent pipe sections will be positively aligned. Such support structures for the pipe sections are typically quite expensive and serve to detract from the commercial feasibility of the irrigation system.

The above noted patent to Reinke illustrates utilization of a particular universal coupling, typically known as the "hook and eye" coupling which is disposed internally of the pipe sections and provides for the amount of universal movement that is desirable. The desirability of the Reinke coupling structure, however, is considerably reduced by interference of the hook and eye connection structure to free flow of water through the iterconnected pipe sections because the coupling presents an obstruction in the flow path of the pipe sections.

As tower supported irrigation systems move about land areas during irrigation operations, it is known that severe tensile and compressive forces are exerted on coupled pipe sections, thereby requiring that the pipe couplings be quite heavy and strong to prevent the couplings from being pulled apart. Obviously an internal "hook and eye" type pipe coupling such as identified in the patent to Reinke, if manufactured of sufficient size to effectively withstand the tensile and compressive loads that are applied thereto, will be of sufficient size to also cause severe restriction of the amount of water flow that can be accomplished at a given water supply pressure. It is necessary when utilizing internal pipe connections of this nature to deliver irrigation water at a higher supply pressure than would be necessary if the irrigation pipe were substantialy free of obstructions. This causes pumping and power requirements to be greater than would be necessary if unobstructed irrigation pipe were employed and thereby adds unnecessarily to the cost of supplying irrigation water to land areas.

It is therefore a primary object of the present invention to provide a novel universal coupling for irrigation pipes that effectively allows both horizontal and vertical misalignment of connected pipe sections without developing excessive strain on the pipe coupling that might otherwise result in damage to the irrigation pipe system.

It is another important feature of the present invention to provide a novel universal coupling between pipe sections of an irrigation system, wherein the mechanism for restraining tensile loads applied to the pipe sections is easily capable of withstanding such tensile loads.

It is another feature of the present invention to provide a novel universal coupling for irrigation pipes that presents a substantially unobstructed flow passage for the water being supplied, allowing the capability of the water supply pumping system to be minimized for a given volume of water that is supplied.

Another feature of the present invention contemplates the provision of a universal pipe coupling, wherein the extremities of pipe sections to be connected are of a size and configuration to allow one extremity of one pipe section to be received within an extremity of the adjacent pipe section in a load bearing supporting/supported relationship.

Among the several features of the present invention is contemplated the provision of a novel universal coupling for irrigation pipe systems, wherein one or both of the extremities of pipe sections to be coupled are of a configuration allowing relative vertical movement of the pipe sections during assembly or disassembly operations.

It is also an impotant feature of the present invention to provide a novel universal coupling for irrigation pipe systems wherein the weight of the irrigation pipe, the truss assembly for the irrigation pipe and the water within the irrigation pipe are employed to maintain adjacent sections of irrigation pipe in assembly.

It is also a feature of the present invention to provide a novel universal coupling for irrigation pipes, wherein a bearing and positioning element is employed that may be disposed between the connected pipe sections and which achieves proper vertical alignment of the adjacent pipe sections as well as preventing wear that might otherwise occur during transverse pivoting of the pipe sections at the coupling.

Another feature of the present invention contemplates the provision of means for establishing a fluid tight seal about the pipe coupling assembly, which means may conveniently take the form of an external sealing boot disposed in sealed relation about the coupling.

It is another feature of the present invention to provide a novel pipe coupling structure for irrigation pipes wherein the coupling structure efficiently restricts the amount of relative rotation that can occur between adjacent pipe sections.

Other and further objects, advantages and features of the present invention will become apparent to one skilled in the art upon consideration of this entire disclosure. The form of the invention, which will now be described in detail, illustrates the general principles of the invention, but it is to be understood that this detailed description is not to be taken as limiting the scope of the present invention.

SUMMARY OF THE INVENTION

A universally movable coupling for irrigation pipes is provided in accordance with the present invention for the several pipe sections that are interconnected to define an irrigations system. The pipe sections to be coupled are of a size and configuration at least at the joint therebetween to allow one of the pipe sections to be received at least partially within the opposite pipe section. To establish physical interconnection between the pipe sections, a connection pin may be provided on one of the pipe sections and may be received within a connection aperture defined on the opposite pipe section. One extremity of one of the pipe sections is supported directly by a movable tower mechanism and the free extremity of the adjacent pipe section is adapted to bear upon the supported pipe section. A bearing and positioning element may be disposed between the supporting and supported pipe sections and may serve to properly orient the extremities of the pipe sections one with the other and may also serve to provide a bearing surface that accommodates any wear that might occur as the pipe sections are moved relative to one another.

If desired, the connector pin may be provided on the upper exterior portion of one of the pipe sections and the opposite pipe section may have a connection aperture formed in the upper extremity thereof to be received by the connection pin. To allow vertical movement of one pipe section relative to the other, in order to achieve assembly or disassembly thereof, at least one of the pipe sections may be of a configuration providing clearance that accommodates such vertical movement.

The pipe sections may be of generally the same diameter and an enlarged coupling structure may be affixed to the extremity of one of the pipe sections to allow the interfitting relationship between the pipe sections that allows positive connection to be established. If desired, the connection pin may be positioned internally of the enlarged connection element for connection with an aperture formed in the extremity of the smaller diameter pipe or, in the alternative, may be provided externally of the small diameter conduit for connection with an aperture formed in the wall structure of the larger diameter conduit. As a further alternative, a connection structure may be secured to one extremity of one of the pipe sections which reduces the diameter of the pipe section and a connection aperture may be formed in the reduced diameter connector portion. A connector pin disposed internally of the opposite pipe section may be received by the aperture to establish the connection that is desired.

Regardless of the particular connection structures employed, the joined coupling mechanisms must be capable of accommodating a certain amount of universal movement as required by horizontal and vertical misalignment that is expected, and, in addition, must be of a configuration that allows vertical movement of one of the pipe sections relative to the other in order to assemble and disassemble the pin and aperture connection. A bearing and positioning element will be provided, as desired, to provide optimum positioning between the connected pipe sections and to provide an appropriate wear resistant pivot that allows such universal movement. The coupling structure also limits the amount of relative rotation that can occur between adjacent pipe sections.

BRIEF DESCRIPTION OF THE DRAWINGS

So that the manner in which the above recited features, advantages and objects of the present invention, as well as others which will become apparent, are attained and can be understood in detail, more particular description of the invention, briefly summarized above, may be had by reference to the embodiments thereof which are illustrated in the appended drawings, which drawings form a part of this specification.

It is to be noted, however, that the appended drawings illstrate only typical embodiments of the invention and are therefore not to be considered limiting of its scope, for the invention may admit to other equally effective embodiments.

In the Drawings:

Figure 1:
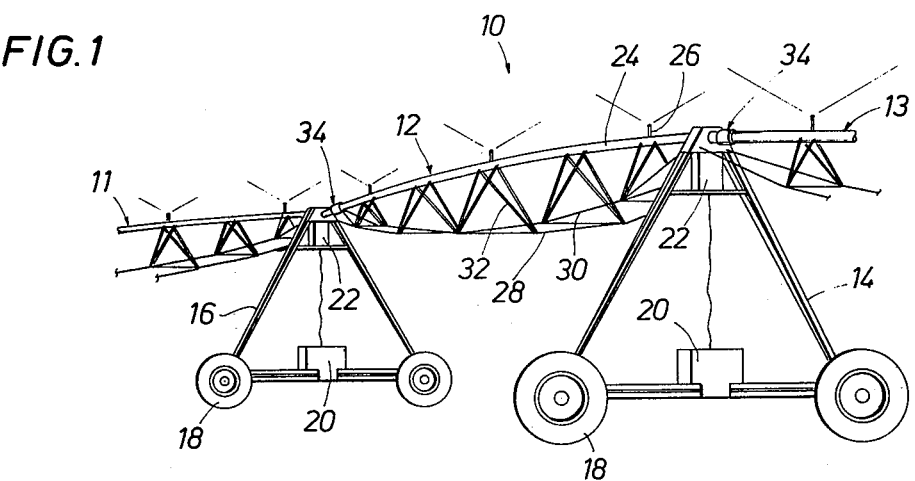

The present invention both as to its organization and manner of operation may best be understood by way of illustration and example of certain embodiments when taken in conjunction with the accompanying drawings in which:

FIG. 1 is a perspective view illustrating a portion of a movable irrigation system having a plurality of interconnected water supply conduits, the couplings of which are constructed in accordance with the present invention.

Figure 2:
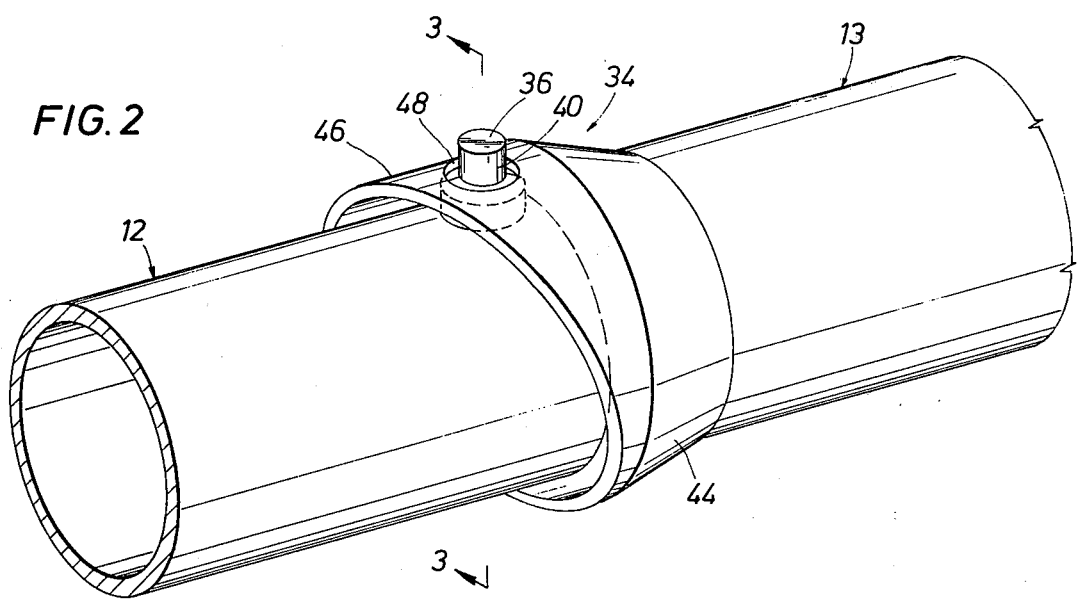

FIG. 2 is an isometric view of the extremities of two pipe sections that are retained in assembly by a coupling constructed in accordance with the present invention.

Figure 3:
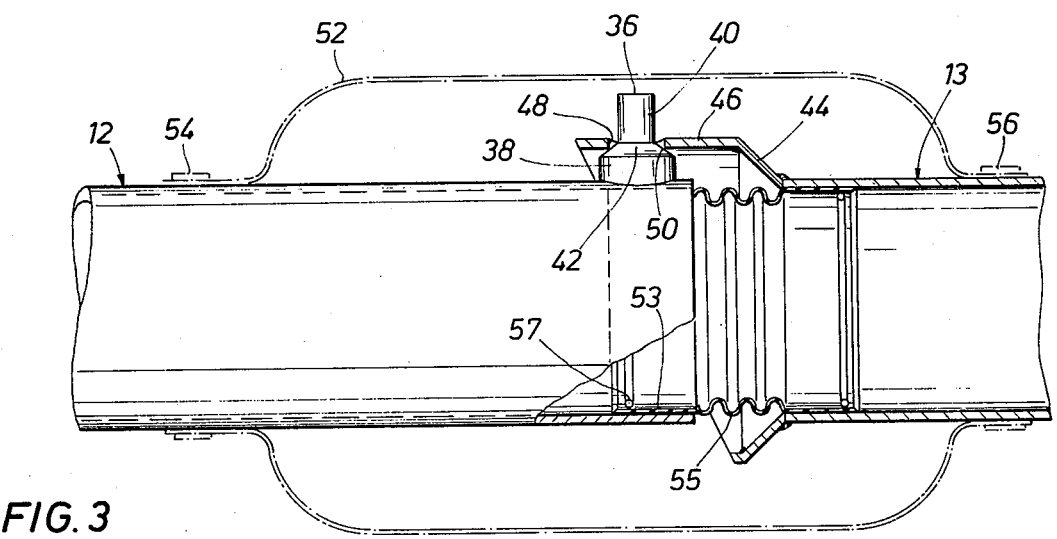

FIG. 3 is a sectional view shown partially in section and partially in full line, depicting the conduit connection structure of FIG. 2 and further illustrating the formation of a fluid tight seal by means of a flexible water impervious boot that covers the coupling structure or a water impervious sleeve that spans the joint between the pipe sections.

Figure 4:
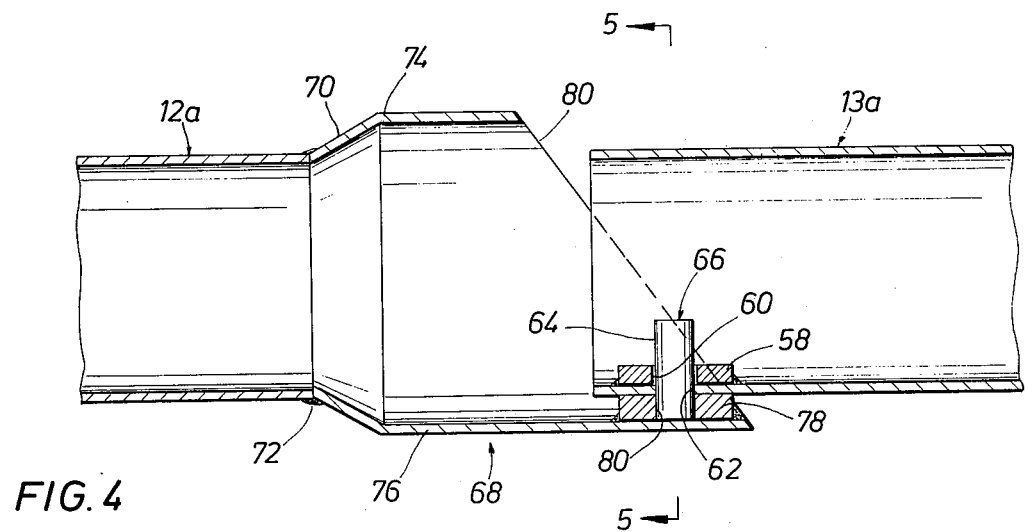

FIG. 4 is a sectional view of an irrigation pipe coupling structure representing a modified embodiment of the present invention.

Figure 5:
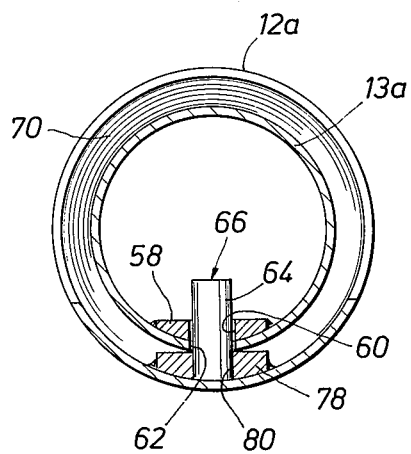

FIG. 5 is a sectional view taken along line 5—5 of FIG. 4.

Figure 6:
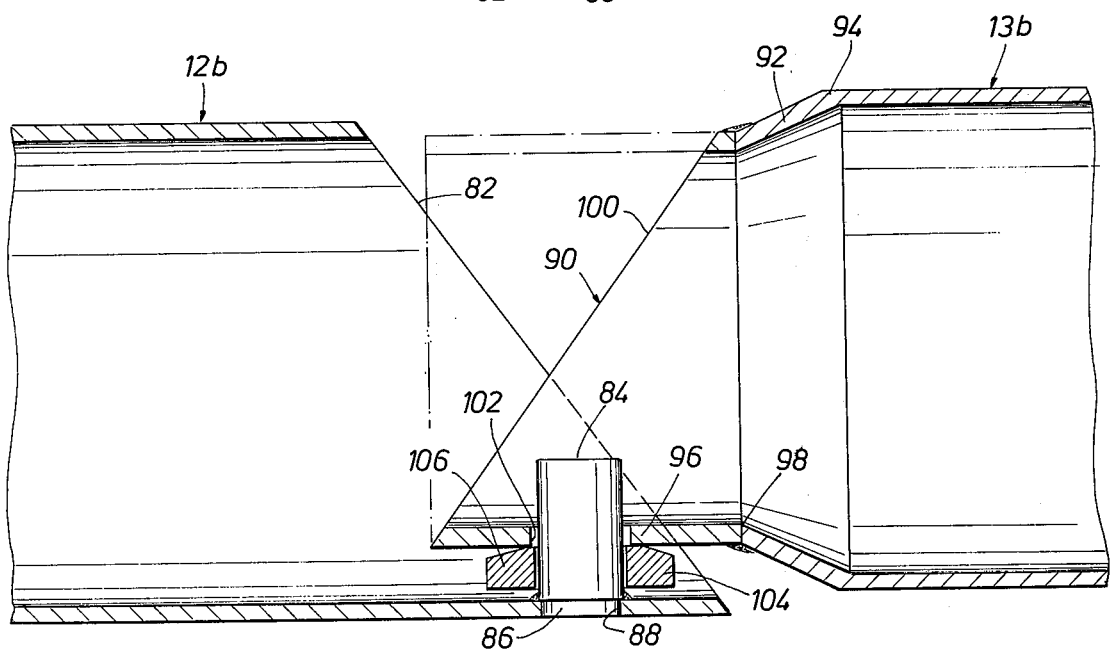

FIG. 6 is a sectional view of pipe coupling structure for irrigation pipe representing a further modified embodiment of the present invention.

DETAILED DESCRIPTION OF PREFERRED EMBODIMENTS

Referring now to the drawings and first to FIG. 1, there is depicted a movable wheeled, tower supported, irrigation system, generally at 10 having truss sections shown generally at 12 that are supported by towers 14 and 16. The towers are in turn supported by ground contacting wheels 18 that may be driven by motorized drive mechanisms 20 that may be powered in any suitable manner, such as by electrical energy, hydraulic power, pneumatic power, etc. Control systems 22, of any suitable nature, may be employed to impart control to the motorized drive systems 20 to achieve individual movement of the respective towers 14 and 16 as is desirable to move the irrigation system over the land area being irrigated.

As illustrated in FIG. 1, each of the trusses 12 comprises a span of irrigation pipe 24 having a plurality of sprinkler heads 26 connected thereto for depositing water in evenly dispursed condition on the land area being irrigated. Each of the spans 24 of irrigation pipe may incorporate a plurality of individual pipe sections because the length of the span may be in the order of 90 feet to 180 feet or as long as 250 feet or so, but for purposes of the present invention, the span 24 of irrigation pipe is considered a single pipe section. The span of irrigation pipe may be bowed upwardly in order to accommodate the forces applied thereto by the weight of the other components of the truss system and the weight of the water contained therein and the irrigation pipe of the span may be maintained in an upwardly bowed condition by a plurality of tension elements 28 and 30 that are connected at the extremities thereof to the irrigation pipe and intermediate the extremities to transverse brace frames 32. The irrigation pipe may also be maintained substantially straight and horizontally disposed, depending upon the particular characteristics that are desired.

As indicated in FIG. 1, one extremity of each of the pipe sections is supported directly by the tower structure 14 and 16 while the opposite extremity of the pipe section or span is supported in a load bearing relationship by means of a connection structure illustrated generally at 34, which connection structure may take the form of the preferred embodiment illustrated in FIGS. 2 and 3. The pipe spans or sections 11, 12 and 13 are illustrated in FIG. 1 and in FIGS. 2 and 3, for the purpose of simplicity, only the irrigation pipes are shown, together with the coupling structure that retains them in assembly. Pipe section 12, as illustrated best in FIG. 3, may be of the same internal and external dimension and configuration at the free extremity thereof as the remainder of the pipe section. In fact, the terminal portion of pipe section 12 may simply be the end of a pipe. A connector projection 36 may be secured to the pipe section 12, such as by welding or by any other suitable form of connection and may be disposed in substantially normal relationship to the path of fluid flow through the pipe. The projection 36 may include an enlarged base portion 38 that may be directly welded or otherwise fixed to the pipe with a pin portion 40 extending upwardly from the base portion 38. The projection 36 may also include an intermediate tapered portion 42 that serves both as a bearing surface and as a locating surface as will be discussed in detail hereinbelow. The bearing surface may take other suitable forms, such as spherical, for example, without departing from the spirit and scope of the present invention.

It will be desirable to retain an adjacent pipe section 13 in assembly with the pipe section 12 for the purpose of transmitting tensile loads between the pipe sections and to allow universal movement of the pipe sections about a pivot established by the connector projection 36. In accordance with the invention, the opposite pipe section 13 may have a frustoconical portion 44 welded or otherwise secured thereto and a generally cylindrical section 46 may be welded to the frustoconical section as shown in FIGS. 2 and 3. The section 46 may be formed to define a connection aperture 48 that is of a dimension to easily receive the pin portion 40 of the projection 36 with an annular edge 50 defined by the aperture 48 engaging the tapered intermediate portion 42 of the connector projection 36. Since the aperture 48 is substantially larger than the diameter of the pin portion 40 and bears directly upon the tapered intermedite portion 42, the pipe sections may be angulated in horizontal manner simply by rotation of the connector pin 40 relative to the aperture 48 about the vertical axis defined by the pin. Likewise, the pipe sections may be pivoted upwardly and downwardly from the position illustrated in FIGS. 2 and 3 without causing any development of strains in the connection structure. In absence of other extraneous forces, the aperture will become centered relative to the tapered intermediate portion 42 by cam action responsive to the weight of the pipe section 13 bearing downwardly upon the connector projection 36.

It will be desirable to provide a connection structure between the pipe sections that may be simply and efficiently engaged or disengaged as the case may be, without sacrificing the physical strength of the connection structure. In accordance with the present invention, simple engagement and disengagement may be effectively achieved by the connection structure illustrated in FIGS. 2 and 3. The cylindrical portion 46 of the connector structure may be beveled as shown in FIGS. 2 and 3, causing the lower portion of the enlarged connector element to be clear of the lower portion of the pipe section 12. This feature effectively allows the pipe section 13 and its connector structure to be moved upwardly relative to pipe section 12, thereby causing the connector projection 36 to be withdrawn from the aperture 48. Likewise, the pipe section 12 may be moved downwardly relative to pipe section 13 to acomplish the disassembly operation if desired. Although the cylindrical section 46 is shown to be beveled to achieve the desired clearance, it is not intended to limit the present invention specifically to this particular feature, it being obvious that clearance may be readily established by connector structure of other configuration without departing from the spirit or scope of the present invention. It is readily apparent that the connector structure, incorporating the connector projection 36 and the aperture 48, will effectively accommodate tensile and compressive loads applied thereto during use of the irrigation system. Moreover, the connection structure is of simple low cost nature and may be easily assembled and disassembled through the use of any suitable lift device and ordinary wrenches.

When the irrigation negotiates undulating terrain, the spans at times will be caused to rotate relative to one another about the pivot defined by the pivot pin and aperture connection, causing the pipe sections to become axially misaligned. Such misalignment is limited by the beveled portion of the connector structure which comes into contact with the pipe section after an allowable degree of relative rotation has occurred between the pipe sections.

It will also be desirable to provide a sealed joint between the pipe sections to prevent undesirable leakage of water. In accordance with the present invention, this may be accomplished by providing a flexible water impervious boot 52 that will effectively withstand the water pressure that is expected. The boot 52 will completely surround the universal connection between pipe joints or spans 12 and 13 and one extremity of the boot will be secured to pipe joint 12 by a retainer band 54. The opposite extemity of the boost 52 will be retained in sealed assembly with pipe joint 13 by means of a retainer band 56.

In the alternative, a water imprervious sleeve such as shown in full line at 53 which may have a flexible center section 55 may be employed to develop a seal between the components of the pipe coupling structure. The sealing sleeve 53 may be retained in position by annular retainer elements 57 and 59 that may take the form of spring urged snap rings.

It may be desirable to locate the physical connecting elements of the pipe joints in such manner that there is virtually no external projection that can in any way interfere with the sealing boot and which will define a rather smooth external configuration. As illustrated in FIGS. 4 and 5, pipe joints or spans 12A and 13A are generally shown, pipe joint 13A being a simple section of pipe having an internal strengthening element 58 secured therein such as by welding or the like. The strengthening element 58 may be formed to define an aperture 60 that is aligned with an aperture 62 formed in the wall structure of the pipe section. The aligned apertures 60 and 62 are adapted to receive the connecting pin portion 64 of a connector projection illustrated generally at 66.

The pipe section or span 12A may have a connector element shown generally at 68 connected to one extremity thereof, which may receive the extremity of pipe section 13A at least partially therein. The connector element 68 may be defined by a frustoconical section 70 having its smaller end welded or othewise fixed to the pipe section 12A at 72. The large extremity 74 of the frustoconical section 70 may provide support for a generally cylindrical portion 76 that is welded or otherwise fixed to the larger extremity 74 of the frustoconical section.

The connector projection 66 may be fixed to the free extremity of the cylindrical portion 76 of the connector element with the base portion of the connector projection being defined by an annular reinforcing element 78 that is welded or otherwise fixed to the internal wall structure of the cylindrical section 76. The lower portion of the reinforcing element 58 and the base element 78 are of curved configuration conforming to the configuration of the internal wall surface to which each are fixed. The base element 78 may define a centrally located aperture 80 that receives the lower extremity of the connector pin 64 and the pin 64 may be welded directly to the base element to provide for positive force transmitting retention thereof. Obviously, the pin and base element may be formed as a single projection element such as by forging or the like and this structure may be welded or otherwise fixed to the conduit structure as desired.

The free extremity of the cylindrical portion 76 of the connector element 68 may be formed to define a bevel 80, allowing the upper portion of the cylindrical section to be cut away, defining clearance in order that the pipe section 13A may be moved vertically relative to the cylindrical section 76 so as to allow simple and efficient assembly and disassembly of the pin and aperture connection between the pipe sections 12A and 13A. The beveled portion also allows for limitation of rotational misalignment of the pipe sections in the same or similar manner as described above. With a conduit connection being provided as illustrated in FIG. 4, pipe section 12A will be supported by a movable support tower in the manner illustrated in FIG. 1, while the extremity of pipe section 13A, in the vicinity of its connection with pipe section 12A, will be supported by the connector element 68. The weight of pipe section 13A, together with the water contained therein and with the other structural elements of the irrigation pipe span, will bear downwardly upon the connector element 68, thereby preventing inadvertent disassembly of the aperture and pin connection between the pipe sections. The coupling structure therefore has a load bearing capability for support of the adjacent extremity of the pipe received thereby.

It may also be desirable that a pin and aperture connection be provided between irrigation pipe spans and that the external dimension of the connection be of a substantially the same dimension as the dimension of the irrigation pipe. In this condition, it will be necessary to reduce the diameter of the pipe connection structure to provide for interconnection of the pipe sections. As shown in FIG. 6, pipe sections 12B and 13B may be provided, both of which being defined by conventional irrigation pipe. One extremity of pipe section 12B may be beveled as shown at 82 to provide an overlying clearance for vertical movement of pipe section 13B relative thereto. A connector projection 84 may be provided that conveniently takes the form of a connector pin having the lower portion thereof welded or otherwise fixed to the internal wall structure of pipe section 12B, the connector pin being located near the extremity of the pipe section. If desirable, the connector projection may have a lower portion 86 thereof which may be received within an aperture 88 defined in the wall structure of pipe section 12B. The interfitting relationship between the lower portion 86 of the pin 84 and the aperture 88 will provide structural integrity in shear that promotes the efficiency of the structural connection between the connector pin 84 and the pipe section 12B.

Pipe section 13B may be provided with a connector element, illustrated generally at 90, which is of reducing diameter and which may include a reducing portion 92 of frustoconical configuration, or any other suitable configuration, having the larger portion thereof fixed to pipe section 13B at 94. A generally cylindrical portion 96 of the connector element 90 may have one extremity thereof fixed by welding or the like to the smaller extremity 98 of the frustoconical section 92. The generally cylindrical portion 96 may also be formed to define a bevel 100 which assists in allowing the clearance necessary for achieving assembly and disassembly of the connection between the pipe section. If desired, the bevel 100 may be eliminated and the cylindrical section 96 may take the form shown in broken line, it only being necessary that there be sufficient clearance to enable the pipe section 13B to be moved vertically relative to pipe section 12B to achieve assembly and disassembly of the pipe sections. The sides of the coupling structure also restrict axial misalignment of adjacent pipe sections.

The cylindrical portion 96 may also for formed to define an aperture 102 that is of sufficient size to receive the connection pin 84 in loose relation therein. This loose relationship between the pivot pin and the aperture effectively prevents development of mechanical strain as the pipe sections are vertically or horizontally angulated.

To achieve proper positioning of the pipe section 13B relative to pipe section 12B and to assist in controlling the relative positions of the pipes during the expected degrees of angular misalignment, a bearing and positioning element 104 may be interposed between pipe section 12B and the cylindrical portion 96 of the connector element, which will serve a load bearing function to transmit the weight of pipe section 13B to the pipe section 12B. The upper surface 106 of the bearing element 104 will be of any suitable configuration that allows proper contact between the cylindrical portion 96 of the connector element 90 and the bearing element 104 for prevention of excessive wear during relative movement of the components of the pipe joint. Excessive stress that might otherwise cause deformation of the material from which the pipe joint is composed, is effectively eliminated and the pipe joint structure will therefore remain serviceable for long periods of time.

In view of the foregoing it is clear that a universally movable coupling has been provided for movable tower supported irrigation pipes, which is capable of achieving angular relationship between sections of the irrigation pipe in both horizontal and vertical planes without causing the irrigation pipes to be overstressed in any way. The coupling structure that is provided is of very simple and low cost nature and yet is constructed to withstand severe tensile and compressive loads without allowing the pipe sections to be separated. The coupling structure is also of such nature that the weight of pipe sections, the water carried thereby and the weight of other structural elements of the truss that assists in supporting the pipe sections, enhances the supporting-/supported relationship of the elements of the coupling structure and serves effectively to retain the pipe sections in assembly.

When it becomes desirable to connect or disconnect individual pipe sections or when it becomes desirable to repair the irrigation system, assembly and disassembly of the pipe sections can be accomplished simply and efficiently through the use of typical lift devices and ordinary wrenches. In addition to the pin and aperture coupling structure for retaining the pipe sections in assembly, bearing and positioning means is employed to establish proper relationship between the pipe sections to allow optimum flow of water therethrough. Internal obstruction of the pipe sections is maintained at a minimum if not eliminated altogether, and maximum flow of water through the irrigation pipe system is effectively achieved. Additionally, this feature allows pumps for the water supply to have low power requirements, thereby improving the commercial feasibilitu of irrigation through use of the present invention. It is therefore seen that this invention is one well adapted to attain all of the objects and advantages hereinabove set forth, together with other features and advantages which will become obvious and inherent from a description of the apparatus itself. It will be understood that certain combinations and subcombinations are of utility and may be employed without reference to other features and subcombinations. This is contemplated by and is within the scope of the present invention.

What is claimed is:
1. A universally movable coupling for irrigation pipes, said coupling comprising:
   first and second pipe sections;
   a connector projection extending transversely from first pipe section in transverse relation to the path of fluid flow through said first pipe section;
   said second pipe section being formed to define a connection aperture in the wall structure thereof, said connection aperture being adapted to receive said connector projection therein, at least one of said first and second pipe sections being formed to define clearance means allowing relative vertical movement between said connector projection and said connection aperture for assembly and disassembly of said pipe sections with the axes of said pipe sections remaining in substantially parallel relation and with no linear separation occuring between said first and second pipe sections during said assembly and disassembly;
   one extremity of one of said first and second pipe sections being adapted to bear upon the other of said first and second pipe sections, the weight thereof maintaining said connector projection in assembly with said connection aperture; and
   means for establishing a fluid tight seal between said first and second pipe sections.
2. A universally movable coupling as recited in claim 1, wherein:
   said second pipe section, at least in the vicinity of said connection aperture is of larger dimension than the dimension of said first pipe section and receives the extremity of said first pipe section at least partially therein.
3. A universally movable coupling as recited in claim 2, wherein:
   said second pipe section, in the vicinity of said connection aperture, is formed to define said clearance means.
4. A universally movable coupling as recited in claim 2, wherein:
   a connection section is fixed to one extremity of said second pipe section, said connection section defining said larger dimension as compared to the dimension of said first pipe section, said connection aperture being formed in said connection section; and
   said locking projection extending outwardly from the outer wall of said first pipe section and being disposed for insertion into said connection aperture.

5. A universally movable coupling as recited in claim 4, wherein:
said connection section is formed to define said clearance means.

6. A universally movable coupling as recited in claim 1, wherein:
said locking projection extends upwardly from and in substantially normal relation to said first pipe section;
said connection aperture is formed in the upper wall of said second pipe section; and
the upper portion of said second pipe section, in the vicinity of said connection aperture, is adapted to bear downwardly upon said first pipe section, the weight of one extremity of said second pipe section maintaining said locking pin and connection aperture in assembly.

7. A universally movable coupling as recited in claim 6, wherein:
bearing and positioning means is interposed between said first and second pipe sections, said bearing and positioning means transmitting forces between said first and second pipe sections and positioning said first and second pipe sections in substantially axially aligned relation.

8. A universally movable coupling as recited in claim 1, wherein said means for establishing a fluid tight seal comprises:
a fluid impervious boot adapted to be disposed about the connected extremities of said first and second pipe sections; and
clamp means for establishing seals between said boot and both of said first and second pipe sections.

9. A universally movable coupling as recited in claim 1, wherein:
a connection portion is provided on said first pipe section and is of larger dimension than the dimension of said second pipe section, said connection portion receiving the extremity of said second pipe section at least partially therein;
said connection projection extending transversely from said connection portion of said first pipe section and being disposed internally of said connection portion;
said connection aperture is formed in the extremity of said second pipe section; and
said connection portion of said first pipe section is formed to define said clearance allowing said generally vertical movement of said second pipe section relative thereto for the purpose of inserting and withdrawing said connection projection relative to said connection aperture.

10. A universally movable coupling as recited in claim 9, wherein said coupling includes:
bearing means being defined about said connection projection and being interposed between said first and second pipe sections, said bearing means maintaining substantially co-axial positioning of said pipe sections relative to one another and defining wear surface means between said pipe sections.

11. A universally movable coupling as recited in claim 1, wherein:
a connection portion is provided on said second pipe section which is of smaller dimension than the dimension of said first pipe section, said connection portion being received at least partially within said first pipe section;
said connection projection extends from said first pipe section and is disposed at least partially internally of said first pipe section; and
said connection aperture is formed in said connection portion and is adapted to receive said connection projection to establish connection between said pipe sections.

12. A universally movable coupling as recited in claim 11, wherein:
the extremities of both said coupling section and said first pipe section are formed to define said clearance means.

13. A universally movable coupling as recited in claim 12, wherein said coupling includes:
bearing means interposed between said connection portion and said first pipe section for establishing relative positioning of said pipe sections.

14. A universally movable coupling for irrigation pipes, said coupling comprising:
first and second pipe sections;
means establishing universally movable connection between said first and second pipe sections;
means provided on one extremity of one of said first and second pipe sections for providing support for one extremity of the other of said first and second pipe sections; and
at least one of said first and second pipe sections being formed to allow connection and disconnection of said universally movalbe connection with the axes of said pipe sections remaining in substantially parallel relation and with no linear separation occuring between said first and second pipe sections during said connection and disconnection.

15. a universally movable coupling as recited in claim 14, wherein said coupling includes:
means for establishing substantially co-axial alignment of said first and second pipe sections.

16. A universally movable coupling as recited in claim 15, wherein said means for establishing substantially co-axial alignment of said first and second pipe sections comprises:
stop surface means being formed on at least one of said first and second pipe sections and engaging the other of said pipe sections upon reaching maximum allowable misalignment of said pipe sections.

17. A universally movable coupling as recited in claim 14, wherein said means establishing universally movable connection between said first and second pipe sections comprises:
a connection section being fixed to one of said first and second pipe sections, said connection section defining support means and defining connection aperture means; and
connection projection means being carried by the other of said first and second pipe sections and being receivable within said connection aperture means upon assembly of said coupling, said support means supporting the weight of said other of said pipe sections upon assembly of said coupling, said connection projection and said connection aperture being moved substantially vertically during said connection and disconnection.

18. A universally movable coupling as recited in claim 17, wherein:
said misalignment limiting means is beveled surface means defined on said connection section and being contacted by the other of said first and second pipe sections upon reaching maximum axial misalignment of said pipe sections and preventing further axial misalignment of said pipe sections.

* * * * *